US011211883B2

(12) United States Patent
Matsunobu et al.

(10) Patent No.: US 11,211,883 B2
(45) Date of Patent: Dec. 28, 2021

(54) CONTROL DEVICE OF ROTARY ELECTRIC MACHINE AND CONTROL METHOD OF THE SAME

(71) Applicant: HITACHI AUTOMOTIVE SYSTEMS, LTD., Hitachinaka (JP)

(72) Inventors: Yutaka Matsunobu, Hitachinaka (JP); Katsuhiro Hoshino, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 188 days.

(21) Appl. No.: 16/496,227

(22) PCT Filed: Jan. 29, 2018

(86) PCT No.: PCT/JP2018/002731
§ 371 (c)(1),
(2) Date: Sep. 20, 2019

(87) PCT Pub. No.: WO2018/179780
PCT Pub. Date: Oct. 4, 2018

(65) Prior Publication Data
US 2021/0119558 A1   Apr. 22, 2021

(30) Foreign Application Priority Data

Mar. 29, 2017   (JP) .............................. JP2017-064162

(51) Int. Cl.
*H02K 1/14*      (2006.01)
*H02P 6/10*      (2006.01)
(Continued)

(52) U.S. Cl.
CPC ................. *H02P 6/10* (2013.01); *H02K 1/16* (2013.01); *H02K 3/12* (2013.01); *H02P 6/15* (2016.02); *H02P 27/06* (2013.01)

(58) Field of Classification Search
CPC .. H02K 1/16; H02K 3/12; H02P 27/06; H02P 6/10; H02P 6/15; Y02T 10/62
See application file for complete search history.

(56) References Cited

U.S. PATENT DOCUMENTS 8,975,856 B2 *   3/2015   Hirt ......................... H02P 23/26
                                                                 318/721
2009/0134833 A1   5/2009   West
(Continued)

FOREIGN PATENT DOCUMENTS

CN   104709110 A   6/2015
JP   H11-55986 A   2/1999
(Continued)

OTHER PUBLICATIONS

International Search Report with English translation and Written Opinion issued in corresponding application No. PCT/JP2018/002731 dated Apr. 24, 2018.

*Primary Examiner* — Muhammad S Islam
(74) *Attorney, Agent, or Firm* — Foley & Lardner LLP

(57) ABSTRACT

An object of the invention is to reduce a torque pulsation. A control device of a rotary electric machine according to the invention includes a sinusoidal wave generation circuit which generates a sinusoidal wave signal according to a magnetic pole position of a rotor of the rotary electric machine, a current command circuit which generates a speed command, a torque command based on actual speed information, and a current command on the basis of the sinusoidal wave signal, and a current control circuit which controls an inverter circuit interposed between a stator winding and a DC power source to make a sinusoidal current flow to the stator winding on the basis of the current command and a current detection signal of the stator winding of the rotary electric machine, wherein the current control circuit periodically changes a current phase of the sinusoidal current (Continued)

when the rotary electric machine is driven by a predetermined torque and a predetermined rotation frequency.

7 Claims, 9 Drawing Sheets

(51) Int. Cl.
    *H02P 6/15*           (2016.01)
    *H02K 1/16*           (2006.01)
    *H02K 3/12*           (2006.01)
    *H02P 27/06*         (2006.01)

(56) References Cited

U.S. PATENT DOCUMENTS

2009/0230802 A1*   9/2009   Kamiya ................... B60L 50/16
                                                                   310/156.53
2011/0254474 A1*   10/2011   Saito ....................... B60L 15/20
                                                                     318/139

FOREIGN PATENT DOCUMENTS

JP          2008-206323 A       9/2008
JP          2011-130520 A       6/2011

\* cited by examiner

CONTROL DEVICE OF ROTARY ELECTRIC MACHINE AND CONTROL METHOD OF THE SAME

TECHNICAL FIELD

The present invention relates to a control device of a rotary electric machine, and particularly to a reduction in pulsation of a magnetic flux caused from a winding slot and in torque pulsation caused from cogging torque.

BACKGROUND ART

A permanent magnet dynamo-electric machine includes a stator and a rotor. The stator includes a stator core where winding slots disposed at almost equal intervals and a stator winding provided in the winding slots. A magnetomotive force distribution of the stator winding becomes a distribution where spatial harmonics are superimposed on a sinusoidal wave (fundamental wave) and varies with time in proportion to the winding current of the stator. In addition, since an opening and a teeth portion of the winding slot are disposed at almost equal intervals in the stator core, the distribution of a magnetic permeance of the stator core also contains ripples of the period of the winding slot. Therefore, a magnetic flux density formed in an air gap of the stator core by the stator is a product of the magnetomotive force distribution of the stator winding and the magnetic permeance of the stator core, so that the magnetic flux density contains spatial harmonic components. In addition, the rotor includes a permanent magnet which is inserted to a groove portion provided in a gap in a rotor core. Therefore, the magnetic flux density formed in the air gap by the rotor also contains ripples similarly, and varies with time due to a rotation movement.

The magnetic flux density of the air gap is obtained by combining the magnetic flux density formed by the stator and the magnetic flux density formed by the rotor. Therefore, the magnetic flux density of the air gap has a distribution where harmonic components are superimposed on a fundamental wave, and varies with time.

Since a torque operating on the rotor is an angular differential of magnetic energy stored in the air gap, a torque pulsation is generated when there are ripples in the magnetic flux density of the air gap. Then, the permanent magnet dynamo-electric machine may generate large oscillations and noises due to the torque pulsation.

In order to reduce the torque pulsation, in a control device of a permanent magnet dynamo-electric machine disclosed in JP 11-55986 A, there is proposed a method in which a change in the magnetic permeance caused by the winding slot of the stator core or torque pulsation data caused by the cogging torque is stored in a torque pulsation memory device, a torque pulsation cancel signal creating circuit reads out the torque pulsation data to create a torque pulsation cancel signal. A torque command is corrected according to the torque pulsation cancel signal such that the sinusoidal current flowing to the stator winding is corrected to reduce the torque pulsation caused by the winding slot or the cogging torque.

CITATION LIST

Patent Literature

PTL 1: JP 11-55986 A

SUMMARY OF INVENTION

Technical Problem

The method of reducing the torque pulsation of PTL 1 is a technique of canceling the torque pulsation by superimposing a harmonic current in a period of the torque pulsation. However, the superimposing of the harmonic current easily causes new oscillations and noises. In addition, the superimposing of the harmonic current on the fundamental current is adding a harmonic amplitude to a fundamental amplitude. Therefore, a maximum current amplitude is increased, that is, the current is increased. Not only PTL 1, but also a number of patents have been filed and each company has considered and developed, but the above problem is one reason why it has not become practical.

An object of the invention is to reduce a torque pulsation.

Solution to Problem

A control device of a rotary electric machine according to the invention includes a sinusoidal wave generation circuit which generates a sinusoidal wave signal according to a magnetic pole position of a rotor of the rotary electric machine, a current command circuit which generates a speed command, a torque command based on actual speed information, and a current command on the basis of the sinusoidal wave signal, and a current control circuit which controls an inverter circuit interposed between a stator winding and a DC power source to make a sinusoidal current flow to the stator winding on the basis of the current command and a current detection signal of the stator winding of the rotary electric machine, wherein the current control circuit periodically changes a current phase of the sinusoidal current when the rotary electric machine is driven by a predetermined torque and a predetermined rotation frequency.

Herein, the meaning of "periodic" indicates that the waveform of the current phase β is changed by a predetermined number of times per one rotation when the rotary electric machine is driven at a predetermined torque and a predetermined rotation frequency. More specifically, in a rotary electric machine which has 12 rotor poles and 36 slots of the stator, the waveform of the current phase β is changed at 36 cycles (the number of slots of the stator) per one rotation. In addition, in a case where the number of rotor poles is 12 and the number of slots of the stator is 72, the number of slots at each pole and each phase becomes Number of slots (=72)/Number of poles (=12)/Number of phases (=3))=2, and thus it becomes Number of slots of the stator (=72)/Number of slots at each pole and each phase (=2)=36 cycles.

The above configuration is for a distributed winding. In the case of a concentrated winding, in the rotary electric machine having 16 rotor poles and 24 slots of the stator, the least common multiple of 16 rotor poles and 24 slots of the stator becomes 48 which is a slot combination indicating that the waveform of the current phase β is changed at 48 cycles per one rotation. While the concentrated winding varies large, as another example, in a rotary electric machine having 10 rotor poles and 12 slots of the stator, the least common multiple of 10 rotor poles and 12 slots of the stator becomes 60 which is a slot combination indicating 60 cycles per one rotation. In the rotary electric machine having 8 rotor poles and 9 slots of the stator, the least common multiple of 8 rotor poles and slots of the stator becomes 72 which is a slot combination indicating 72 cycles per one rotation.

Further, the control method of the invention is to reduce a torque pulsation by periodically changing the current phase β. Therefore, the current value is constant at a predetermined torque and at a predetermined rotation frequency. This configuration is a feature different from PTL 1 in which the harmonic currents are superimposed.

A range of changing β is roughly divided into two parts. If β causing the maximum torque is set to βtmax, the ranges where the current phase β is periodically changed falls within βtmax≤β and β≤βtmax.

The range of βtmax≤β is a so-called weak magnetic field region, and a voltage of a rotary electric machine can be suppressed. In particular, the range is desirably used for a high rotation. On the other hand, in the range of β≤βtmax, the voltage becomes larger than βtmax. Therefore, the voltage may exceed a battery voltage limit at a high rotation. However, in a rotation frequency region not exceeding the battery voltage limit, this range may be used.

The control of the invention is not limited to the use in the whole region where the rotary electric machine is driven. The reason is that the oscillations and noises caused by the torque pulsation may be caused by resonance with other components in many cases. In that case, the torque pulsation may also be reduced using the control only on a resonance frequency region of the component.

With the present invention, the torque pulsation can be zero theoretically. However, there is a tolerance of the torque pulsation in every product. Therefore, the range of periodically changing the current phase β, of the present invention can turn ON/OFF during one rotation in order to make the torque pulsation within the tolerance.

Advantageous Effects of Invention

With a drive control device of the rotary electric machine according to the invention and a drive device of the rotary electric machine equipped with the drive control device, the torque pulsation can be reduced without causing the effective value of the current input from an inverter to exceed a maximum value without reliance upon a structure of salient poles of a rotor and a structure of a permanent magnet.

DESCRIPTION OF EMBODIMENTS

Hereinafter, embodiments of the invention will be described using the drawings.

Figure 1:
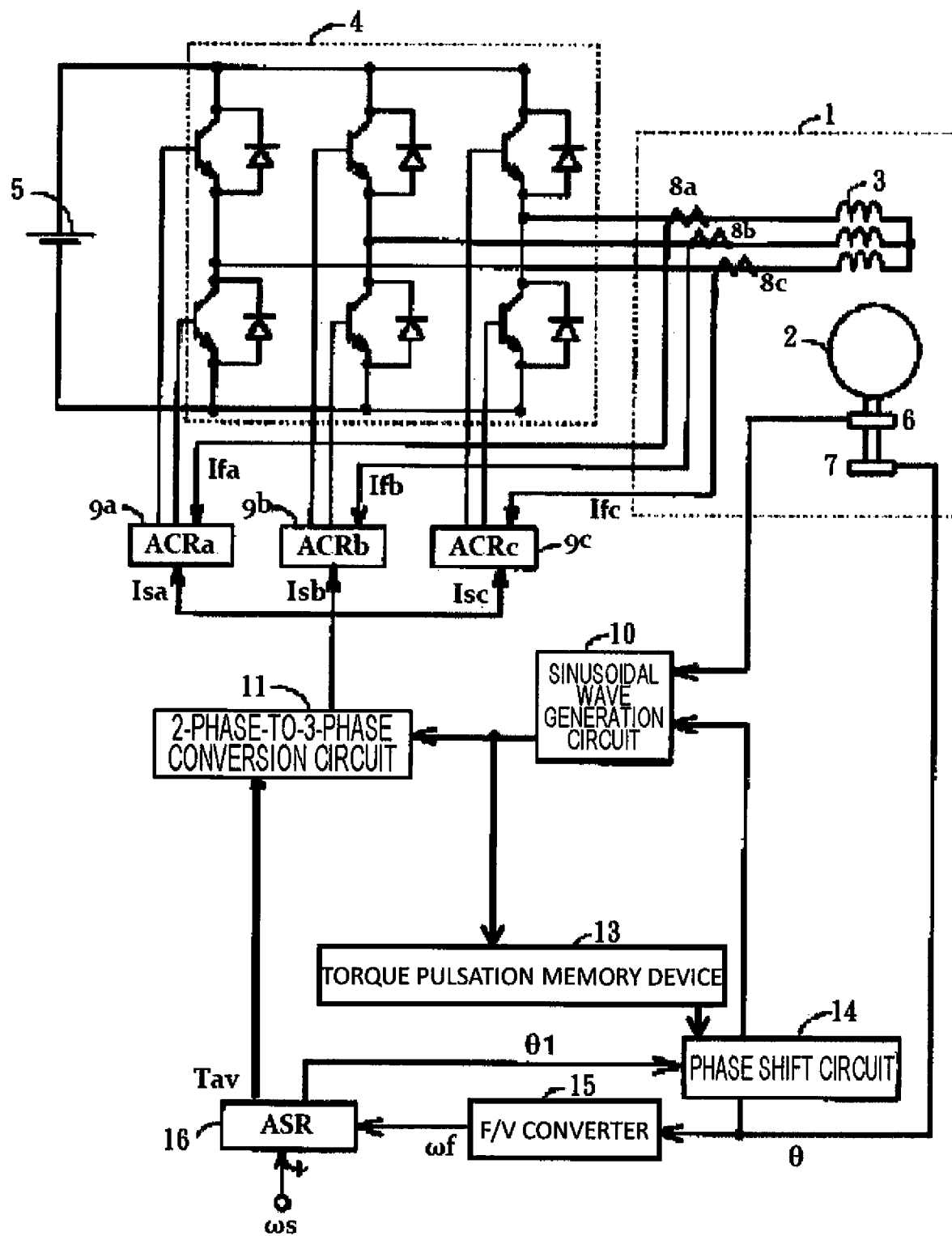
FIG. 1 is a circuit block diagram of a control device of a permanent magnet dynamo-electric machine in this embodiment.
Figure 2:
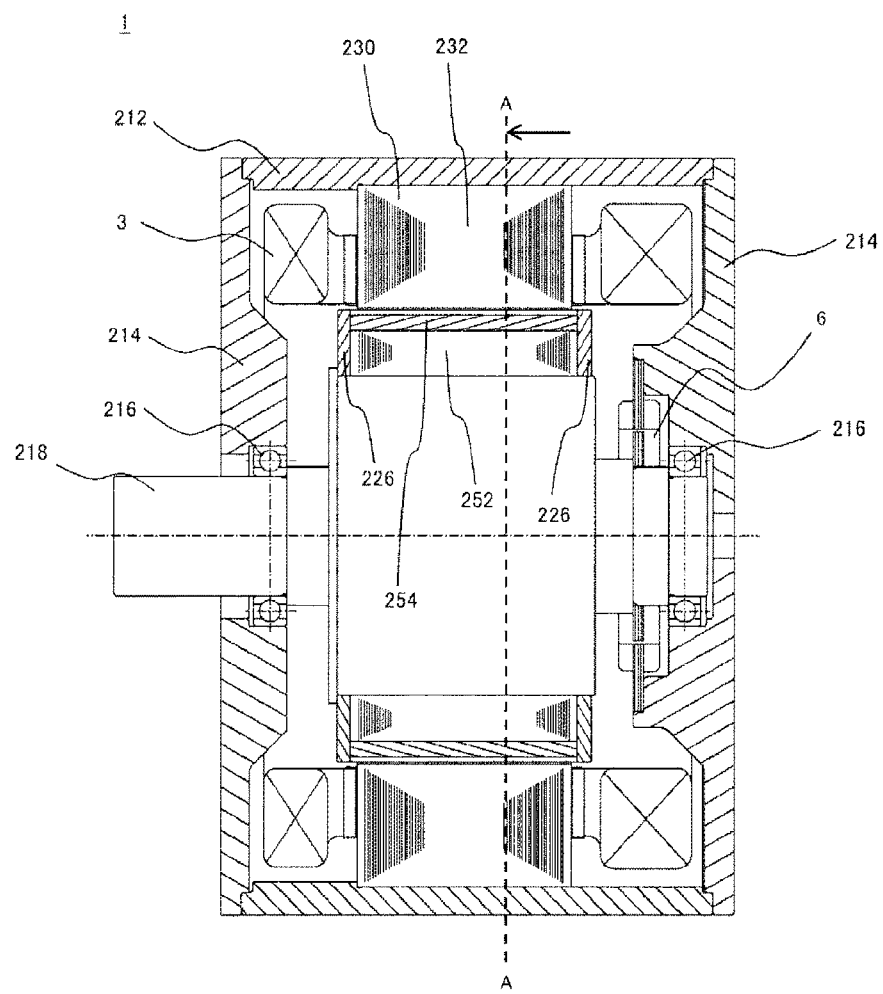
FIG. 2 is a cross-sectional view taken along an axial direction of a permanent magnet dynamo-electric machine 1 of this embodiment.
Figure 3:
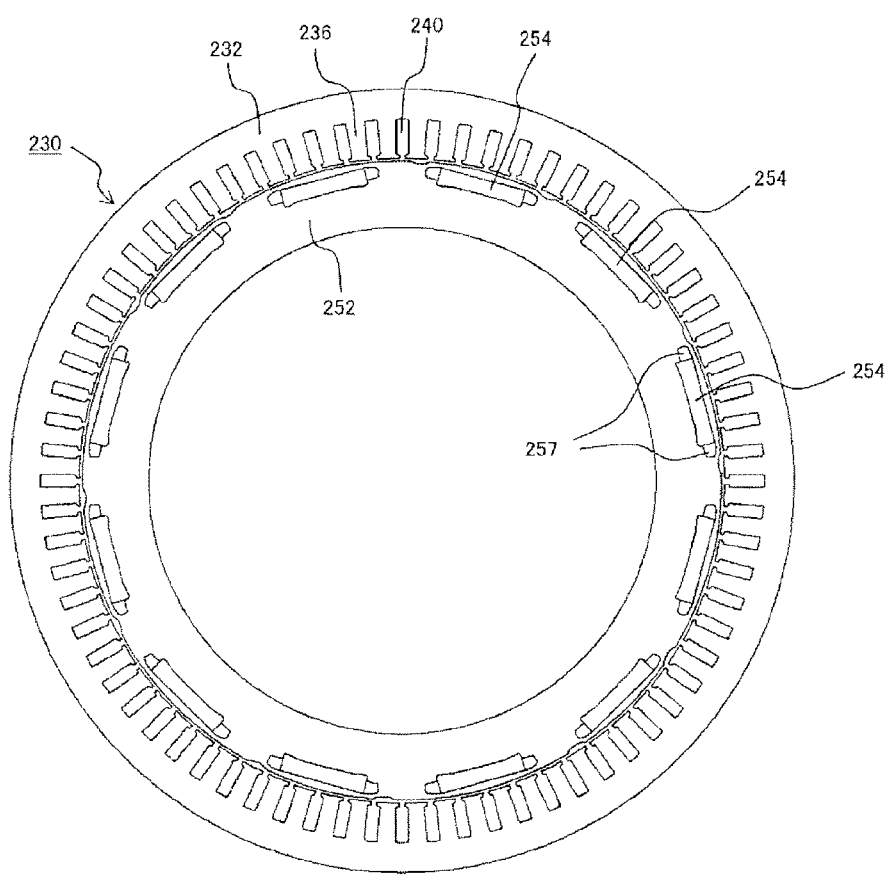
FIG. 3 is a cross-sectional view of the permanent magnet dynamo-electric machine 1 when viewed from a direction of arrow of a cross section AA of FIG. 2.

FIG. 1 is a circuit block diagram of a control device of a permanent magnet dynamo-electric machine 1 in this embodiment. FIG. 2 is a cross-sectional view taken along an axial direction of the permanent magnet dynamo-electric machine 1 of this embodiment. FIG. 3 is a cross-sectional view of the permanent magnet dynamo-electric machine 1 when viewed from a direction of arrow of a cross section AA of FIG. 2.

In FIGS. 1 to 3, reference numeral 1 denotes a permanent magnet dynamo-electric machine, reference numeral 2 denotes a rotor, and reference numeral 3 denotes a stator winding. The rotor 2 includes a rotor core 252 fitted to a shaft 218, and a permanent magnet 254 provided in a stator core 252. In the shaft 218, a position detector 6 to detect a magnetic pole position of the rotor 2 and an encoder 7 to detect a rotation speed are attached.

On the other hand, the stator 230 includes a stator core 232, and a stator winding 3 which is provided in a slot 240 formed in the stator core 232 to generate a rotating magnetic field. The slot 240 is a space formed between teeth portions 236.

A housing 212 fixes the stator 230. An end bracket 214 closes an opening of the housing 212. A bearing 216 is a member to support the shaft 218 to the end bracket 214. Plates 226 are provided at both ends in the axial direction of the stator core 232.

In the stator core 232, magnetic gaps 257 are formed at both ends in a circumferential direction of the permanent magnet 254.

In the electric circuit to control the permanent magnet dynamo-electric machine 1, an inverter 4 supplies a stator winding current from a DC power source 5 to the stator winding 3. Most of control systems for calculation processing are configured by employing a micro-computer. However, the control processing function herein will be described using a control circuit.

A speed control circuit (ASR) 16 receives a speed command ωs and an actual speed ωf obtained by converting rotation amount information θ from the encoder 7 using an F/V converter 15, and calculates a difference ωe (ωe=ωs−

ωf). Further, the speed control circuit 16 outputs an average torque command Tav and a phase shift command θ1 as needed according to a PI control (P: proportional term, I: integral term) based on the difference ωe.

A sinusoidal wave generation circuit 10 generates a sinusoidal wave signal of the same phase as an induced voltage of each phase (three phases in this embodiment) of the stator winding 3 or a sinusoidal wave signal shifted in phase as needed from magnetic pole position information from the position detector 6 and the rotation amount information θ from the encoder 7.

At a predetermined rotation frequency and a predetermined torque, torque pulsation data is read out from a torque pulsation memory device β in synchronization with the sinusoidal wave signal, and a current phase value is periodically generated such that the output torque becomes constant (the torque pulsation is reduced).

A 2-phase-to-3-phase conversion circuit 11 outputs current commands Isa, Isb, and Isc for the respective phases of the stator winding 3 according to the torque command Ts and the sinusoidal wave signal output from the sinusoidal wave generation circuit 10. Phase current control circuits (ACR) 9a, 9b, and 9c for controlling the currents of the respective phases of the stator winding 3 output control signals according to the current commands Isa, Isb, and Isc and current detection signals Ifa, Ifb, and Ifc from phase current detectors 8a, 8b, and 8c to the inverter 4 to control the respect phase currents, and generate the rotating magnetic field in synchronization with the rotation position of the rotor 2.

Figure 4:
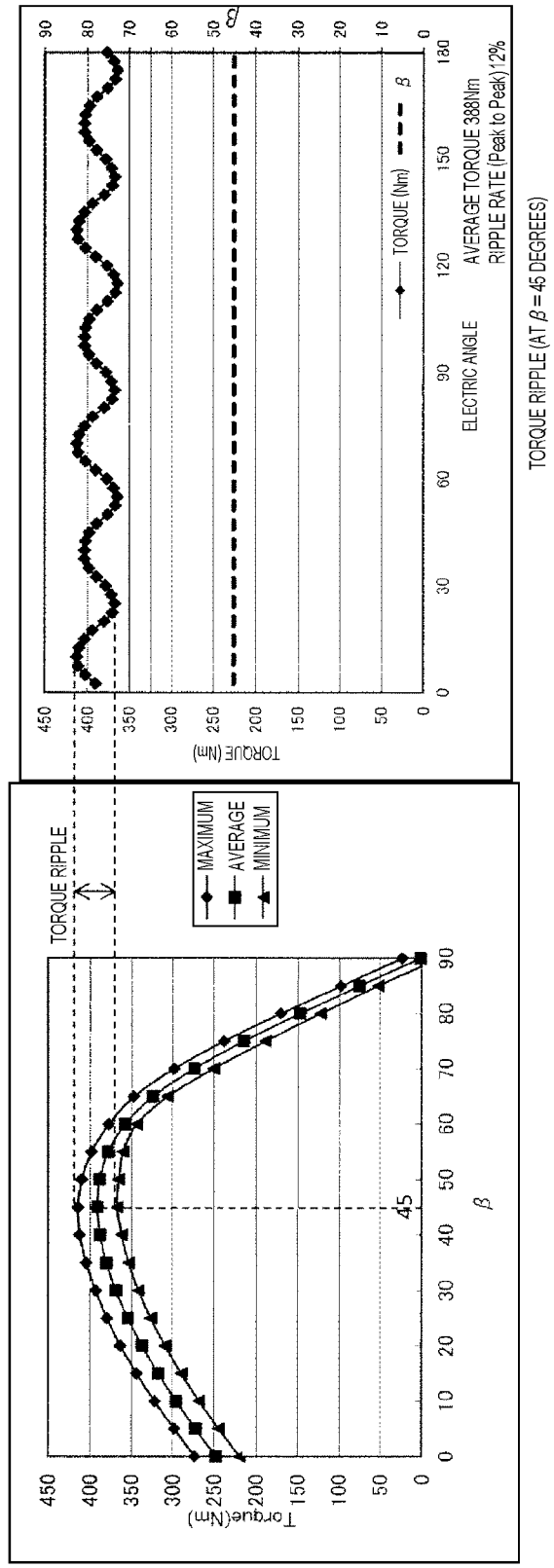
FIG. 4 is an explanatory diagram of a torque pulsation to which the invention of this embodiment is not implemented as a comparative example, in which the left drawing is a graph illustrating a minimum torque and a maximum torque in a case where a horizontal axis represents the current phase, a vertical axis represents torque, and the current phase is changed from 0 to 90. The right drawing is a graph illustrating a torque pulsation (for one pole) at β=45 degrees where the torque is maximized in the left drawing.

The torque pulsation in the permanent magnet dynamo-electric machine 1 will be described with reference to FIGS. 4 to 6. FIG. 4 is an explanatory diagram of the torque pulsation to which the invention according to this embodiment is not implemented as a comparative example. The right drawing of FIG. 4 is a graph illustrating a torque pulsation (for one pole) at β=45 degrees at which the torque is maximized.

While the minimum values and the maximum values of the right drawing of FIG. 4 are plotted, the left drawing is a graph illustrating minimum torques and maximum torques in a case where the current phase is changed from 0 to 90 at β=45 of the left drawing. Further, a horizontal axis represents the current phase, and the vertical axis represents torques. A ripple rate (=(Maximum torque−Minimum torque)/Average torque×100) in a case where the invention according to this embodiment is not used is 12%, and the average torque is 388 Nm.

Figure 5:
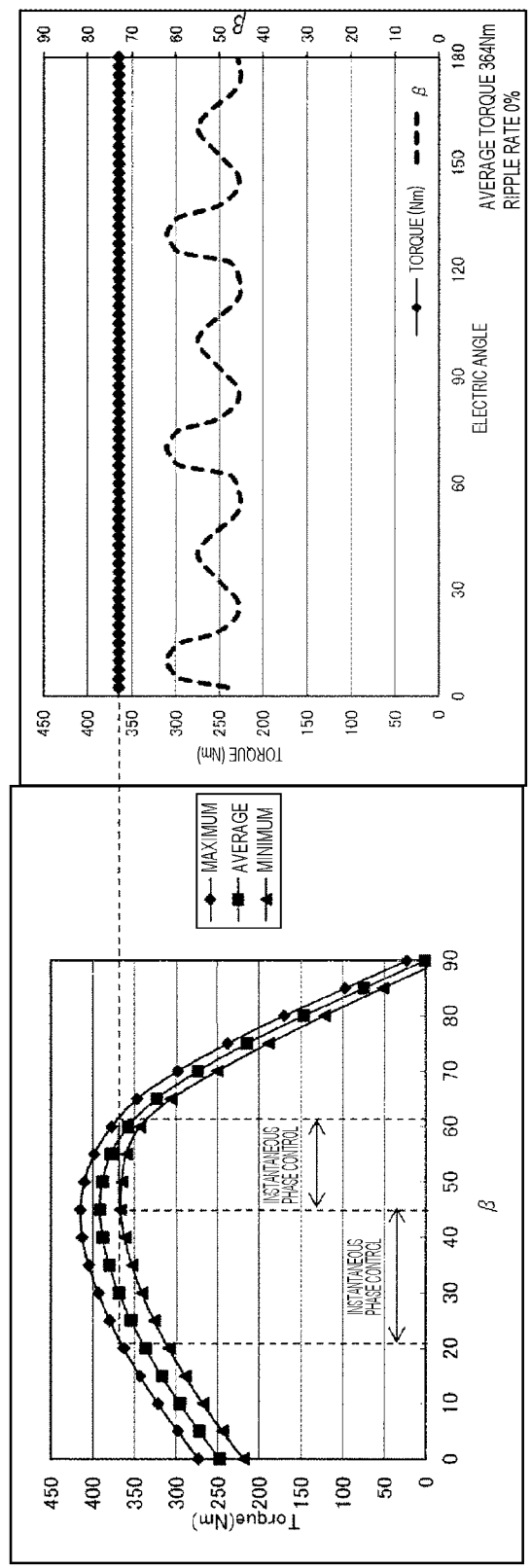
FIG. 5 is an explanatory diagram of a torque pulsation to which the invention of this embodiment is used, in which the left drawing is a graph illustrating a minimum torque and a maximum torque in a case where a horizontal axis represents the current phase, a vertical axis represents torque, and the current phase is changed from 0 to 90. The right drawing is a graph in which β is periodically changed at each electric angle to be equal to the minimum torque at β=45 degrees in the left drawing.

FIG. 5 is an explanatory diagram of a torque pulsation to which the invention of this embodiment is used. Similarly to FIG. 4, the left drawing is a graph illustrating a minimum torque and a maximum torque in a case where a horizontal axis represents the current phase, a vertical axis represents torque, and the current phase is changed from 0 to 90. The right drawing is a graph in which β is periodically changed at each electric angle to be equal to the minimum torque at β=45 degrees in the left drawing.

In a case where the invention according to this embodiment is used, the ripple rate becomes 0% theoretically (not exactly 0 in practice due to various error factors). On the other hand, the average torque is 364 Nm, and 6% or less.

Figure 6:
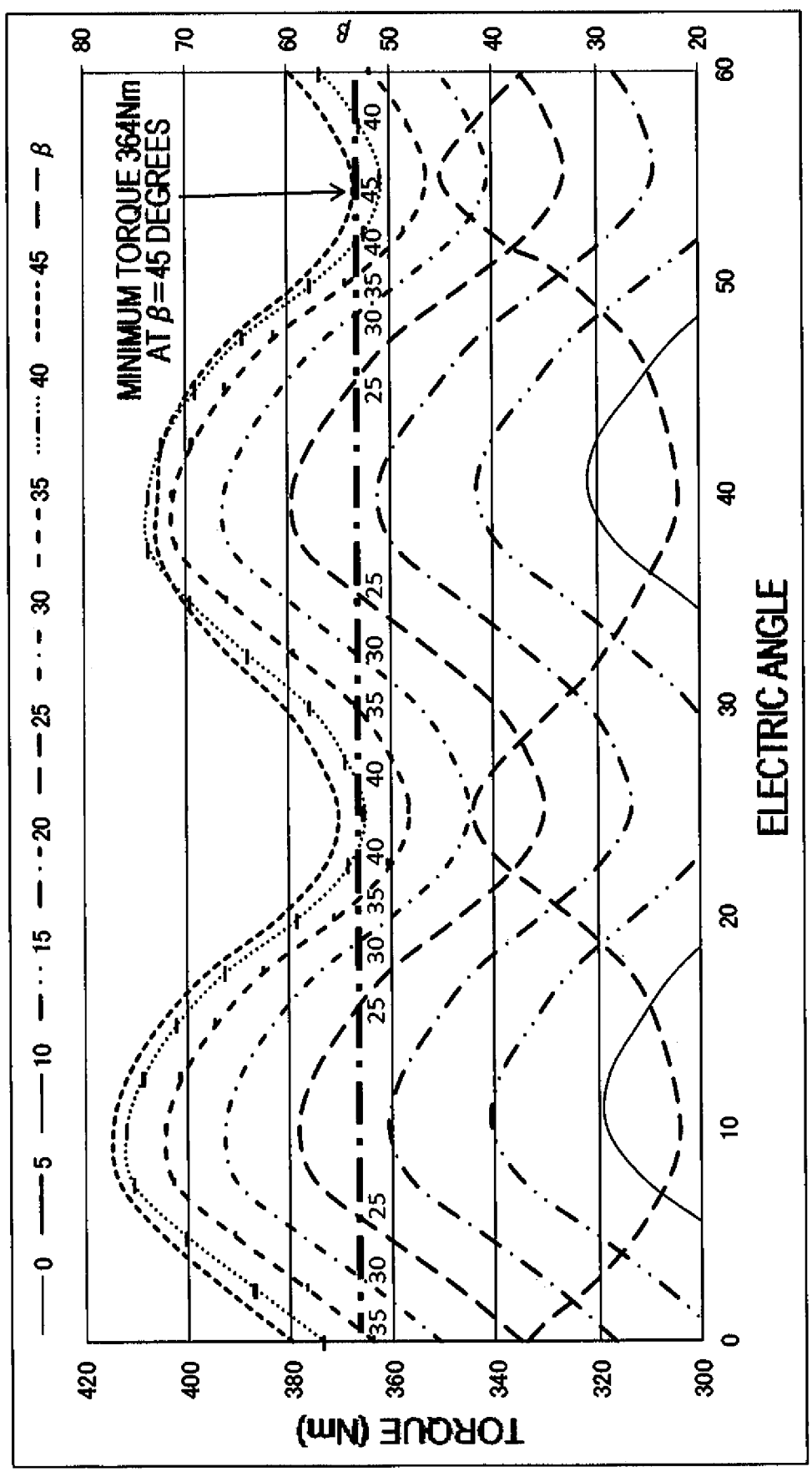
FIG. 6 is a detailed explanatory diagram of the torque pulsation in a case where this embodiment is used.

FIG. 6 explains FIG. 5 in detail, in which the torque pulsations at β=0 to 45 are illustrated. Herein, if a chain line is drawn from a minimum torque value of 364 Nm at β=45 degrees, a torque waveform at each β intersecting the chain line is found at each electric angle (corresponding to the position of the rotor). Specifically, β is 35 degrees at an electric angle of 1 degree, β is 30 degrees at an electric angle of 3 degrees, and β is 25 degrees at an electric angle 6 degrees. The dotted line of FIG. 6 is obtained by plotting β (the horizontal axis is the right axis). FIG. 6 illustrates only at the electric angle range of 60 degrees. However, β is repeated periodically. Three cycles are repeated for one pole (the electric angle of 180 degrees).

In a rotary electric machine of this embodiment, the number of rotor poles is 12, and the number of slots of the stator is 72. Thus, the number of slots at each pole and each phase is Number of slots (=72)/Number of poles (=12)/Number of phases (=3))=2, which corresponds to Number of slots of the stator (=72)/Number of slots (=2) at each pole and each phase=36 cycles/one rotation.

Regardless of that the number of slots is 72, the reason why that the 36 periods is obtains is that the number of slots per one pole is 6, 3 phases are supplied, and thus the layout of phases becomes "U, U, W, W, V, V" and the number of slots at each pole and each phase becomes Number of slots (=72)/Number of poles (=12)/number of phases (=3))=2.

The above configuration is for a distributed winding. In the case of a concentrated winding, in the rotary electric machine having 16 rotor poles and 24 slots of the stator, the least common multiple of 16 rotor poles and 24 slots of the stator becomes 48 which is a slot combination indicating that the waveform of the current phase β is changed at 48 cycles per one rotation. While the concentrated winding varies large, as another example, in a rotary electric machine having 10 rotor poles and 12 slots of the stator, the least common multiple of 10 rotor poles and 12 slots of the stator becomes 60 which is a slot combination indicating 60 cycles per one rotation. In the rotary electric machine having 8 rotor poles and 9 slots of the stator, the least common multiple of 8 rotor poles and slots of the stator becomes 72 which is a slot combination indicating 72 cycles per one rotation.

Further, the control method of the invention is to reduce a torque pulsation by periodically changing the current phase β. Therefore, the current value is constant at a predetermined torque and at a predetermined rotation frequency. This configuration is a feature different from PTL 1 in which the harmonic currents are superimposed.

A range of changing β is roughly divided into two parts. If β causing the maximum torque is set to βtmax, the ranges where the current phase β is periodically changed falls within βtmax≤β and β≤βtmax.

FIG. 5 illustrates the case of βtmax and FIG. 6 illustrates the case of β≤βtmax. The range of βtmax≤β is a so-called weak magnetic field region, and a voltage of a rotary electric machine 1 of a permanent magnet type can be suppressed. In particular, the range is desirably used for a high rotation. On the other hand, in the range of β≤βtmax, the voltage becomes larger than βtmax. Therefore, the voltage may exceed a battery voltage limit at a high rotation. However, in a rotation frequency region not exceeding the battery voltage limit, this range may be used.

In a rotary electric machine 1 of a permanent magnet type for an electric vehicle, the torque pulsation in a low speed region may cause oscillations and noises. The problem of the torque pulsation is lessened at a high speed region. Therefore, if the control device of the permanent magnet dynamo-electric machine 1 according to this embodiment is performed as a control device in an electric vehicle, the control mat performed to reduce the torque pulsation in a low speed region equal to or less than a predetermined speed. In a high speed region exceeding the speed setting, the control may be performed to reduce the torque pulsation.

According to such a control, the torque pulsation in a low speed region causing a problem can be reduced. In a high speed region, the control processing load of the control system (calculation processing device) can be alleviated by omitting the current phase control in a high speed region, so that the left processing performance may be used for other control processes.

Figure 7:
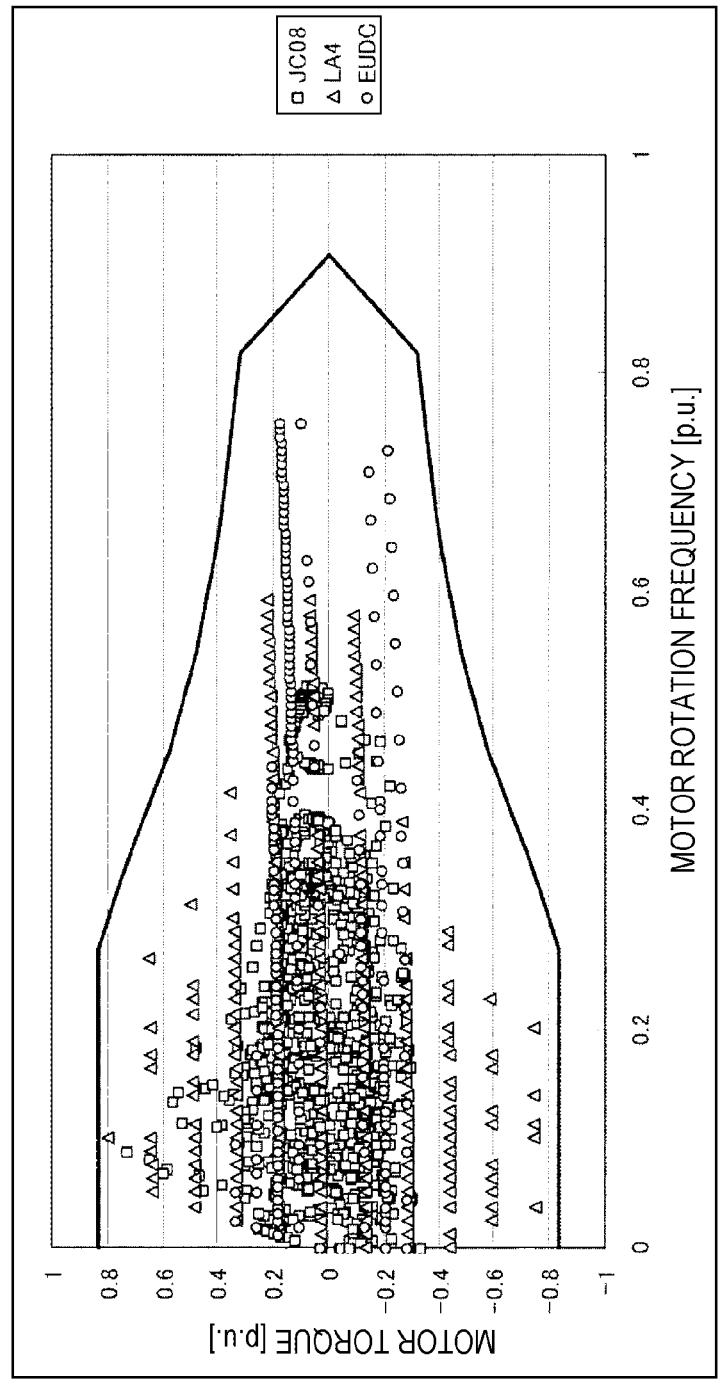
FIG. 7 is a diagram illustrating an example of a motor usage distribution in a travel mode such as JC08, LA4, and EUDC of a vehicle on an N-T map.

For reference, FIG. 7 is a diagram illustrating an example of a motor usage distribution in a travel mode such as JC08, LA4, and EUDC of a vehicle on an N-T map.

The older 10-15 mode was set as a fuel measurement method in 1991, and the usage environments of a vehicle has been changed and the measurement technique has been developed. Therefore, JC08 was introduced from April 2011 to meet an actual traveling furthermore.

LA4 is a pattern that a vehicle actually travels on a route centered on a downtown in Los Angeles during a morning commuting time zone.

EUDC (extra urban driving cycle) is an element of a traveling method at the time of measuring fuel efficiency which was established 1996 as a part of NEDC (New European Driving Cycle), which includes an urban driving cycle (old standard) and constant traveling at 90 km/h and 120 km/h. In NEDC, a part replaced with the latter two constant travelings is called an extra urban driving cycle.

In many cases, this cycle is used in a low speed and low torque region. The oscillations and noises caused by the torque pulsation may be caused by resonance with other components in many cases. In that case, the torque pulsation may also be reduced using the control only on a resonance frequency region of the component.

In addition, with this embodiment, the torque pulsation can be zero theoretically. However, there is a tolerance of the torque pulsation in every product. Therefore, the range of periodically changing the current phase β of this embodiment can turn ON/OFF during one rotation in order to make the torque pulsation within the tolerance.

Figure 8:
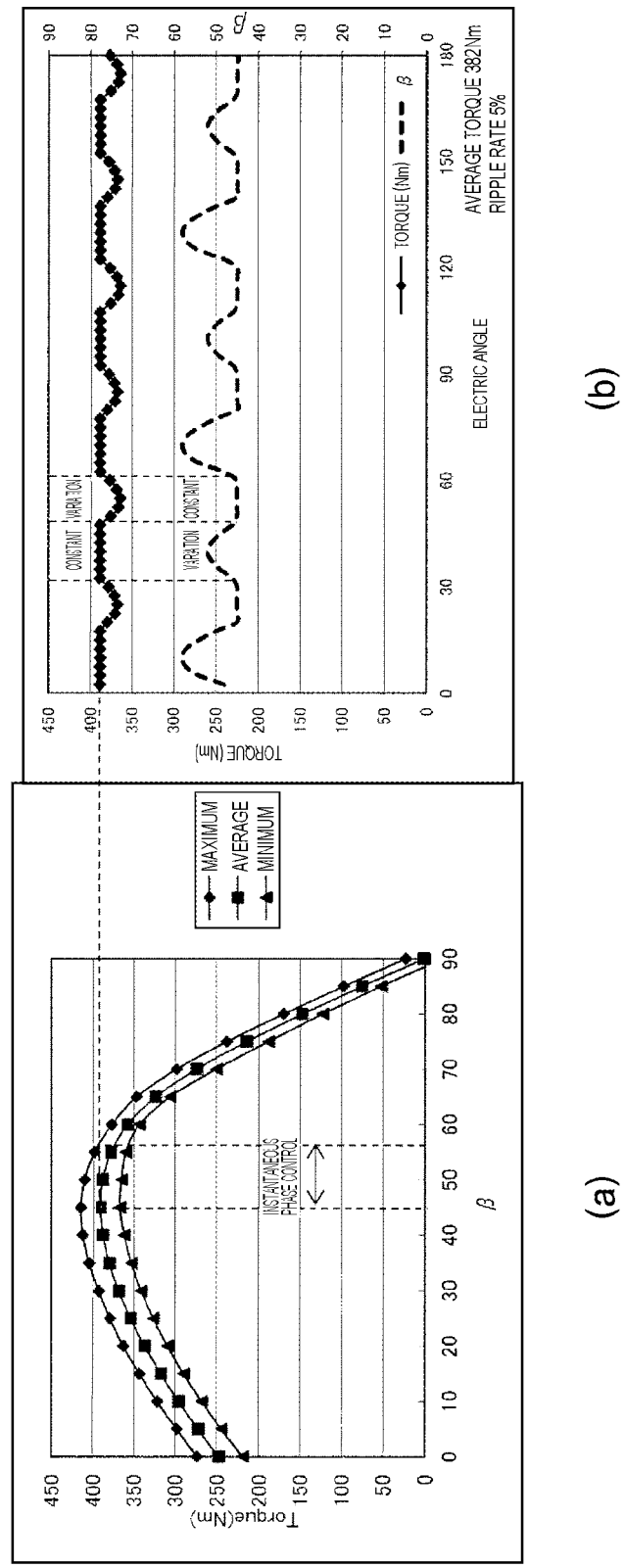
FIG. 8 is an explanatory diagram of a torque pulsation to which this embodiment is used, in which the left drawing is a graph illustrating a minimum torque and a maximum torque in a case where a horizontal axis represents the current phase, a vertical axis represents torque, and the current phase is changed from 0 to 90. The right drawing is a graph in which β is periodically changed at each electric angle to be equal to an average torque at β=45 degrees in the left drawing.

FIG. 8 illustrates a case where the invention according to this embodiment is used partially. In FIG. 8, the right drawing is a graph in which β is periodically changed at each electric angle to be equal to an average torque at β=45 degrees in the left drawing.

β is changed to reduce the torque pulsation in the electric angle where the torque pulsation becomes larger than the average torque. β is kept constant (45 degrees) in the electric angle where the torque pulsation becomes smaller than the average torque, and thus the torque pulsation is not reduced. The ripple rate in the right drawing is 5%, and is reduced by 7% compared to 12% of FIG. 4 where the invention according to this embodiment is not used. On the other hand, the average torque is 382 Nm, and is reduced only by 2% compared to 388 Nm of FIG. 4 where the invention is not used.

The above description is an example of the embodiment of the invention, and the invention is not limited to these embodiments. A person skilled in the art may make various modifications without adversely affecting the features of the invention.

Figure 9:
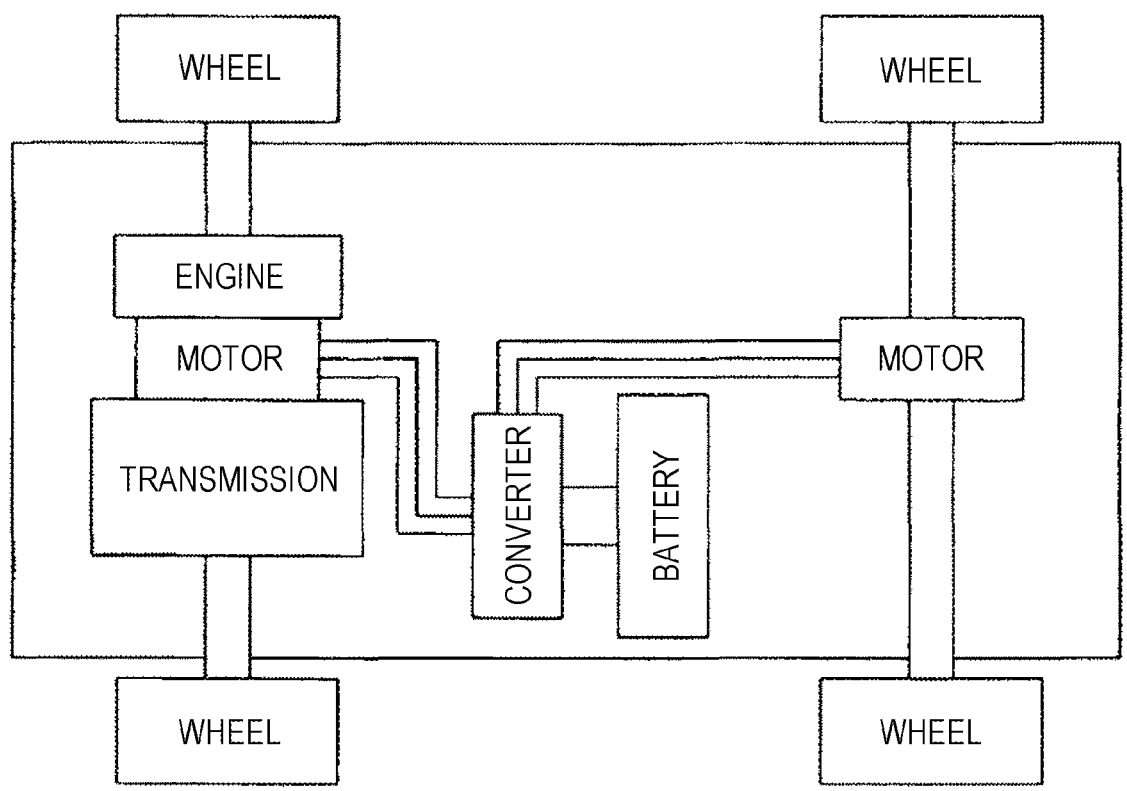
FIG. 9 is a diagram illustrating a schematic configuration of a hybrid electric vehicle in which a drive device of a rotary electric machine according to this embodiment is mounted.

FIG. 9 is a diagram illustrating a schematic configuration of a hybrid electric vehicle in which a drive device of the rotary electric machine according to this embodiment is mounted. The hybrid electric vehicle includes a so-called plug-in hybrid electric vehicle, a series hybrid electric vehicle, and a parallel hybrid electric vehicle which travels in an EV mode. In addition, the vehicles such as an electric vehicle and a fuel cell vehicle having the same problems are also included.

Even in the rotary electric machine, the rotary electric machine of an embedded-magnet inner rotary type is explained as an example. However, an outer-rotor type, a surface magnet type, or an induction motor may be applied. In addition, the stator has been described mainly focusing on the distributed winding. However, a concentrated winding, a wave winding, a multiple winding may be applied. Further, the number of slots for each pole may be a fraction slot which is not 3n times (that is, 3, 6, 9, . . . ).

REFERENCE SIGNS LIST 1 rotary electric machine of permanent magnet type
2 rotor
3 stator winding
4 inverter
5 DC power source
6 position detector
7 resolver
8a phase current detector
8b phase current detector
8c phase current detector
9a phase current control circuit
9b phase current control circuit
9c phase current control circuit
10 sinusoidal wave generation circuit
11 2-phase-to-3-phase conversion circuit
13 torque pulsation memory device
15 F/V converter
16 speed control circuit
212 housing
214 end bracket
216 bearing
218 shaft
226 plate
230 stator
232 stator core
236 portion teeth
240 slot
252 rotor core
254 permanent magnet
257 magnetic gap

The invention claimed is:

1. A control device of a rotary electric machine, comprising:
a sinusoidal wave generation circuit configured to generate a flux sinusoidal wave signal according to a magnetic pole position of a rotor of the rotary electric machine;
a current command circuit configured to generate a speed command, a torque command based on actual speed information, and a current command on the basis of the sinusoidal wave signal; and
a current control circuit configured to control an inverter circuit interposed between a stator winding and a DC power source to make a sinusoidal current flow to the stator winding on the basis of the current command and a current detection signal of the stator winding of the rotary electric machine,
wherein the current control circuit is configured to periodically change a current phase of the sinusoidal current when the rotary electric machine is driven by a predetermined torque and a predetermined rotation frequency such that an output torque is constant,
wherein the current command circuit is configured to generate a speed command to cause a speed to be increased to reduce a torque pulsation, and wherein the current control circuit is configured to periodically change the current phase by a number of slot combinations of the rotor and the stator of the rotary electric machine during one rotation, the slot combinations based on a least common multiple of a number of the stator slots and rotor poles.

2. The control device of the rotary electric machine according to claim 1,
wherein the current control circuit is configured to periodically change the current phase by a number of slots of the stator of the rotary electric machine during one rotation, or by Number of slots of the stator of the rotary electric machine during one rotation/Number of slots at each pole and each phase.

3. The control device of the rotary electric machine according to claim 1,
wherein the current control circuit is configured to periodically change the current phase in a constant current value.

4. The control device of the rotary electric machine according to claim 1,
wherein, if a current phase to cause a maximum torque is βtmax, a range of periodically changing the current phase β is βtmax≤β.

5. The control device of the rotary electric machine according to claim 1,
wherein, if a current phase to cause a maximum torque is βtmax, a range of periodically changing a current phase β is β≤βtmax.

6. The control device of the rotary electric machine according to claim 1,
wherein the current control circuit is configured to change the current phase in a period where the torque pulsation is constant, the current phase is constant in a period where the torque pulsation is changed, and the current phase is periodically changed.

7. A control method of a rotary electric machine, comprising:
generating a flux sinusoidal wave signal according to a magnetic pole position of a rotor of the rotary electric machine;
generating a speed command, a torque command based on actual speed information, and a current command on the basis of the sinusoidal wave signal; and
controlling an inverter circuit interposed between a stator winding and a DC power source to make a sinusoidal current flow to the stator winding on the basis of the current command and a current detection signal of the stator winding of the rotary electric machine,
wherein a current phase of the sinusoidal current is periodically changed when the rotary electric machine is driven by a predetermined torque and a predetermined rotation frequency such that an output torque is constant,
wherein a speed command is generated to cause a speed to be increased to reduce a torque pulsation, and
wherein the current phase is periodically changed by a number of slot combinations of the rotor and the stator of the rotary electric machine during one rotation, the slot combinations based on a least common multiple of a number of the stator slots and the rotor poles.

* * * * *